US008164453B2

(12) United States Patent
Wang et al.

(10) Patent No.: US 8,164,453 B2
(45) Date of Patent: Apr. 24, 2012

(54) PHYSICAL AUDIT SYSTEM WITH RADIO FREQUENCY IDENTIFICATION AND METHOD THEREOF

(75) Inventors: Shing-Jin Wang, Taoyuan County (TW); Tain-Wen Suen, Taoyuan County (TW); Ming-Town Lee, Taoyuan County (TW)

(73) Assignee: Chung Shan Institute of Science and Technology, Armaments Bureau, M.N.D., Taoyuan County (TW)

( * ) Notice: Subject to any disclaimer, the term of this patent is extended or adjusted under 35 U.S.C. 154(b) by 1011 days.

(21) Appl. No.: 11/857,628

(22) Filed: Sep. 19, 2007

(65) Prior Publication Data

US 2009/0072973 A1    Mar. 19, 2009

(51) Int. Cl.
*G08B 13/14* (2006.01)
(52) U.S. Cl. .............. 340/572.1; 340/10.1; 340/10.4; 340/539.22; 340/10.51; 235/375; 235/385
(58) Field of Classification Search ............ 340/572.1, 340/10.1
See application file for complete search history.

(56) References Cited

U.S. PATENT DOCUMENTS

| 5,061,917 | A | * | 10/1991 | Higgs et al. ............ 340/539.22 |
| 5,063,380 | A | * | 11/1991 | Wakura .................. 340/539.13 |
| 5,406,256 | A | * | 4/1995 | Ledel et al. ............ 340/539.22 |
| 5,455,409 | A | * | 10/1995 | Smith et al. .................. 235/385 |
| 5,488,223 | A | * | 1/1996 | Austin et al. .................. 235/375 |
| 5,562,621 | A | * | 10/1996 | Claude et al. ............ 604/100.03 |
| 5,664,146 | A | * | 9/1997 | Bolin et al. .................. 711/115 |
| 5,949,335 | A | * | 9/1999 | Maynard .................. 340/572.1 |
| 5,959,529 | A | * | 9/1999 | Kail, IV .................. 340/539.12 |
| 6,094,173 | A | * | 7/2000 | Nylander .................. 343/742 |
| 6,127,928 | A | * | 10/2000 | Issacman et al. ............ 340/572.1 |
| 6,177,860 | B1 | * | 1/2001 | Cromer et al. .............. 340/10.1 |
| 6,188,973 | B1 | * | 2/2001 | Martinez et al. .............. 702/188 |
| 6,293,467 | B1 | * | 9/2001 | Reddersen et al. ...... 235/462.15 |
| 6,720,866 | B1 | * | 4/2004 | Sorrells et al. .............. 340/10.4 |
| 6,762,691 | B2 | * | 7/2004 | Piazza .................. 340/8.1 |
| 6,769,604 | B2 | * | 8/2004 | Ichikawa et al. .............. 235/375 |
| 6,795,935 | B1 | * | 9/2004 | Unkle et al. .................. 714/37 |
| 6,808,255 | B1 | * | 10/2004 | Haines et al. .................. 347/86 |
| 6,876,295 | B1 | * | 4/2005 | Lewis .................. 340/10.34 |
| 6,885,288 | B2 | * | 4/2005 | Pincus .................. 340/10.51 |
| 6,977,587 | B2 | * | 12/2005 | Pradhan et al. .......... 340/539.26 |
| 7,049,958 | B2 | * | 5/2006 | Fischer et al. .......... 340/539.17 |
| 7,183,924 | B1 | * | 2/2007 | Ku .................. 340/572.1 |
| 7,267,269 | B2 | * | 9/2007 | Kikuchi .................. 235/383 |
| 7,289,027 | B2 | * | 10/2007 | Hunt et al. .................. 340/572.1 |
| 7,295,132 | B2 | * | 11/2007 | Steiner .................. 340/8.1 |
| 7,298,257 | B2 | * | 11/2007 | Suzuki .................. 340/539.12 |

(Continued)

*Primary Examiner* — Benjamin C Lee
*Assistant Examiner* — Quang D Pham
(74) *Attorney, Agent, or Firm* — Rosenberg, Klein & Lee

(57) ABSTRACT

The present invention relates to a physical audit system with radio frequency identification (RFID) and a method thereof, which perform physical audit by means of RFID. First, a plurality of electronic tags is set in a physical system and all the physical units included in the physical system, respectively. The plurality of electronic tags records physical configuration data related to the physical system and the physical units, respectively. A radio-frequency writer unit writes the physical configuration data of a newer version according to the physical system and the physical units. Then, a radio-frequency reader unit reads the physical configuration data of the plurality of electronic tags, and transmits the physical configuration data to an integrated data processing device for analyzing and comparing the physical configuration data. It is judged if the physical configuration is identical to comparison data in the integrated data processing device.

12 Claims, 5 Drawing Sheets

U.S. PATENT DOCUMENTS

| | | | | |
|---|---|---|---|---|
| 7,304,573 | B2* | 12/2007 | Postma | 340/572.1 |
| 7,307,534 | B2* | 12/2007 | Pesavento | 340/572.1 |
| 7,379,799 | B2* | 5/2008 | Cleary et al. | 701/29 |
| 7,436,303 | B2* | 10/2008 | Tourrilhes et al. | 340/572.1 |
| 7,450,952 | B1* | 11/2008 | Kaundinya | 455/456.1 |
| 7,511,848 | B2* | 3/2009 | Crosier et al. | 358/1.15 |
| 7,554,448 | B2* | 6/2009 | Tomioka | 340/572.1 |
| 7,586,412 | B2* | 9/2009 | Takatama | 340/572.1 |
| 7,642,914 | B2* | 1/2010 | Campbell et al. | 340/572.1 |
| 7,786,847 | B2* | 8/2010 | Kang | 340/14.61 |
| 7,868,755 | B2* | 1/2011 | Hanai et al. | 340/539.22 |
| 2002/0140966 | A1* | 10/2002 | Meade et al. | 358/1.15 |
| 2002/0191998 | A1* | 12/2002 | Cremon et al. | 400/76 |
| 2003/0032446 | A1* | 2/2003 | Pincus | 455/556 |
| 2003/0135246 | A1* | 7/2003 | Mass et al. | 607/60 |
| 2003/0227392 | A1* | 12/2003 | Ebert et al. | 340/825.49 |
| 2004/0119588 | A1* | 6/2004 | Marks | 340/539.1 |
| 2004/0144842 | A1* | 7/2004 | Brignone et al. | 235/385 |
| 2004/0178269 | A1* | 9/2004 | Pradhan et al. | 235/462.13 |
| 2005/0001718 | A1* | 1/2005 | Asauchi | 340/539.3 |
| 2005/0109829 | A1* | 5/2005 | Postma | 235/375 |
| 2005/0248455 | A1* | 11/2005 | Pope et al. | 340/539.27 |
| 2005/0252979 | A1* | 11/2005 | Konuma et al. | 235/492 |
| 2005/0280511 | A1* | 12/2005 | Yokoyama et al. | 340/10.5 |
| 2006/0017962 | A1* | 1/2006 | Burdette et al. | 358/1.15 |
| 2006/0022829 | A1* | 2/2006 | Pan | 340/572.3 |
| 2006/0055530 | A1* | 3/2006 | Wang et al. | 340/539.13 |
| 2006/0071773 | A1* | 4/2006 | Ahmed et al. | 340/521 |
| 2006/0071785 | A1* | 4/2006 | Ahmed et al. | 340/539.22 |
| 2006/0087442 | A1* | 4/2006 | Smith et al. | 340/686.1 |
| 2006/0092072 | A1* | 5/2006 | Steiner | 342/46 |
| 2006/0094295 | A1* | 5/2006 | Sakaguchi | 439/567 |
| 2006/0171538 | A1* | 8/2006 | Larson et al. | 380/270 |
| 2006/0181395 | A1* | 8/2006 | Gruszynski | 340/10.51 |
| 2006/0220856 | A1* | 10/2006 | Shaffer et al. | 340/572.1 |
| 2006/0222430 | A1* | 10/2006 | Duckett et al. | 400/583 |
| 2006/0238309 | A1* | 10/2006 | Takatama | 340/10.41 |
| 2006/0244568 | A1* | 11/2006 | Tong et al. | 340/10.41 |
| 2006/0244596 | A1* | 11/2006 | Larson et al. | 340/572.1 |
| 2006/0261946 | A1* | 11/2006 | Himberger et al. | 340/572.1 |
| 2006/0279412 | A1* | 12/2006 | Holland et al. | 340/10.51 |
| 2007/0008641 | A1* | 1/2007 | Tada et al. | 360/69 |
| 2007/0057771 | A1* | 3/2007 | Tomioka | 340/10.1 |
| 2007/0125836 | A1* | 6/2007 | McAllister et al. | 235/375 |
| 2007/0159779 | A1* | 7/2007 | Chang | 361/683 |
| 2007/0258048 | A1* | 11/2007 | Pitchers | 353/26 R |
| 2007/0270694 | A1* | 11/2007 | Pelissier et al. | 600/443 |
| 2007/0273517 | A1* | 11/2007 | Govind | 340/572.1 |
| 2007/0279295 | A1* | 12/2007 | Nakazono et al. | 343/700 MS |
| 2008/0001744 | A1* | 1/2008 | Batra et al. | 340/572.1 |
| 2008/0030324 | A1* | 2/2008 | Bekritsky et al. | 340/539.22 |
| 2008/0048837 | A1* | 2/2008 | Montgomery et al. | 340/10.51 |
| 2008/0050847 | A1* | 2/2008 | Gluschenkov et al. | 438/6 |
| 2008/0055084 | A1* | 3/2008 | Bodin et al. | 340/572.1 |
| 2008/0061965 | A1* | 3/2008 | Kuhns et al. | 340/539.22 |
| 2008/0068156 | A1* | 3/2008 | Shimokawa et al. | 340/539.22 |
| 2008/0083824 | A1* | 4/2008 | Postma | 235/375 |
| 2008/0084304 | A1* | 4/2008 | Yarvis | 340/572.1 |
| 2008/0114228 | A1* | 5/2008 | McCluskey et al. | 600/365 |
| 2008/0196170 | A1* | 8/2008 | Choi | 8/137 |
| 2008/0300818 | A1* | 12/2008 | Brey et al. | 702/130 |
| 2009/0099889 | A1* | 4/2009 | Okamoto et al. | 705/7 |
| 2009/0256680 | A1* | 10/2009 | Kilian | 340/10.1 |

* cited by examiner

|  | Model number | Memory capacity | Dimension | Communication distance |
|---|---|---|---|---|
| | RMD-155A | 0.05G byte | 0X.0X.0X (mm) | 3000~5000 (mm) |
| | RMD-255B | 0.5G byte | 0X.0X.0X (mm) | 4000~7000 (mm) |
| | Battery usage time | xxxxx | | |
| Identification data of equipment modules | Equipment model: | System name or code | | |
| | Vendor number: | Clearly define type and item/Type of component/part | | |
| | Standard number: | Defined performance standard and related specifications of a system | | |
| | Contract number: | Contract number of the contract signed between the design house and the buyer | | |
| | Manufacturing serial number: | Define the unique component among all components with identical type, item, and numbering | | |
| | Type serial number : | Properly categorize the equipments/important components has different unit type code | | |
| | Design house code : | Company code of the design house, for example: GE 99971 | | |
| | Manufacturer : | Manufacturer of the equipment | | |
| TAG number | | Read/write data update of proprietary article | | |
| Environmental characteristics | Collision | 10g/3a*es *1000bumps | | |
| | Humidity | Water-tolerant | | |
| | Vibration | 5g/25~220hz | | |
| | Impact | 50g/sec | | |

Figure 5

PHYSICAL AUDIT SYSTEM WITH RADIO FREQUENCY IDENTIFICATION AND METHOD THEREOF

FIELD OF THE INVENTION

The present invention relates generally to an audit system and a method thereof, and particularly to a physical audit system with radio frequency identification (RFID) and a method thereof.

BACKGROUND OF THE INVENTION

According to the prior art, physical audit is performed in accordance with the military handbook of configuration management guidance MIL-HDBK-61, or referring to the audit plan similar to ISO10007. In modern physical configuration audit operations, checklist of audit documents and required tools are prepared, according to the standard operation instructions and through procedures, relevant and necessary mechanical and electrical equipments are disassembled and the system modules to be audited are invaded inside their board modules, the configuration component numbers of the single boards in the board modules are verified, the single board nameplate and the configuration identification data are checked (for example, the blueprint, the standard, or engineering changes), the audit checklist is signed, and the follow-up audit is traced for timely proposing the improvement advises and appraisal report. Hopefully, the foreseen problems will not happen in the subsequent work.

However, present audit operations need professional engineers to examine relevant documents layer by layer according to the regulated procedure. Thereby, the standard documentary audit and procedure control sequence for external quality are overemphasized. Hence, the audit tends to stress on normal technical examinations, which waste time on preparation and on find faults in the system while doing internal verification. As a result, the audit cannot reveal correctly and sufficiently the difference with the audit configuration standard.

In addition, with the digital technology advancement, modern system modules adopt new technologies and techniques for introducing new functions, which not only improve present system functions but also enhance system complexity (as the Tkach's Complexity Gap shown in FIG. 1). It is insufficient and incapable if the traditional audit method is used to conduct physical audit on the complex system composed of high-tech precision structures. Thereby, it is necessary to adjust audit technologies and control methods.

Moreover, according to the traditional procedure of audit operations, while performing operations in accordance with the standard operation instructions, the walk-through process has to be executed then the objective can be achieved. Namely, by means of minute and complicated procedures, the system modules are invaded for going deep into the interior of the board modules, and the mechanical and electrical equipments are disassembled. This examination method tends to result in static discharge, which will destroy or deteriorate sensitive components and parts. Besides, because complex precision systems have complex hierarchical structure, if the traditional procedure of audit operations is adopted, the path of the walk-through process is more difficult.

Accordingly, the present invention provides a novel physical audit system and a method thereof for not only improving the operation procedure of traditional audit method on systems with high-tech precision structures, but also reducing difficulty of performing walk-through processes without the need of disassembling the mechanical and electrical equipments. Thereby, damages on the equipments can be avoided, and the problems described above can solved.

SUMMARY

An objective of the present invention is to provide a physical audit system with radio frequency identification (RFID) and a method thereof, which can perform audit operation on systems with high-tech precision structures by means of radio frequency identification (RFID).

Another objective of the present invention is to provide a physical audit system with RFID and a method thereof, which can reduce the difficulty of performing walk-through processes.

Still another objective of the present invention is to provide a physical audit system with RFID and a method thereof, which can avoid disassembling the mechanical and electrical equipments, and thus avoid damaging the equipments.

The physical audit system according to the present invention includes a plurality of electronic tags, a radio-frequency (RF) reader, and an integrated data processing device. The physical audit method comprises setting the plurality of electronic tags in a physical system and a physical unit included in the physical system, respectively, the RF reader reading physical configuration data of the plurality of electronic tags and transmitting the physical configuration data to the integrated data processing device, the integrated data processing device receiving the physical configuration data to perform analysis and compare the physical configuration data for judging if the physical configuration data is identical to the comparison data in the integrated data processing device.

In addition, the physical audit system according to the present invention further includes a read/write device, which includes an RF writer unit and an RF reader unit writing or reading the physical configuration data in accordance with the physical system and physical unit for modifying or updating the physical configuration data.

BRIEF DESCRIPTION OF THE DRAWINGS

FIG. 5 shows a data table in an electronic tag according to a preferred embodiment of the present invention.

DETAILED DESCRIPTION

In order to make the structure and characteristics as well as the effectiveness of the present invention to be further understood and recognized, the detailed description of the present invention is provided as follows along with preferred embodiments and accompanying figures.

Figure 1:
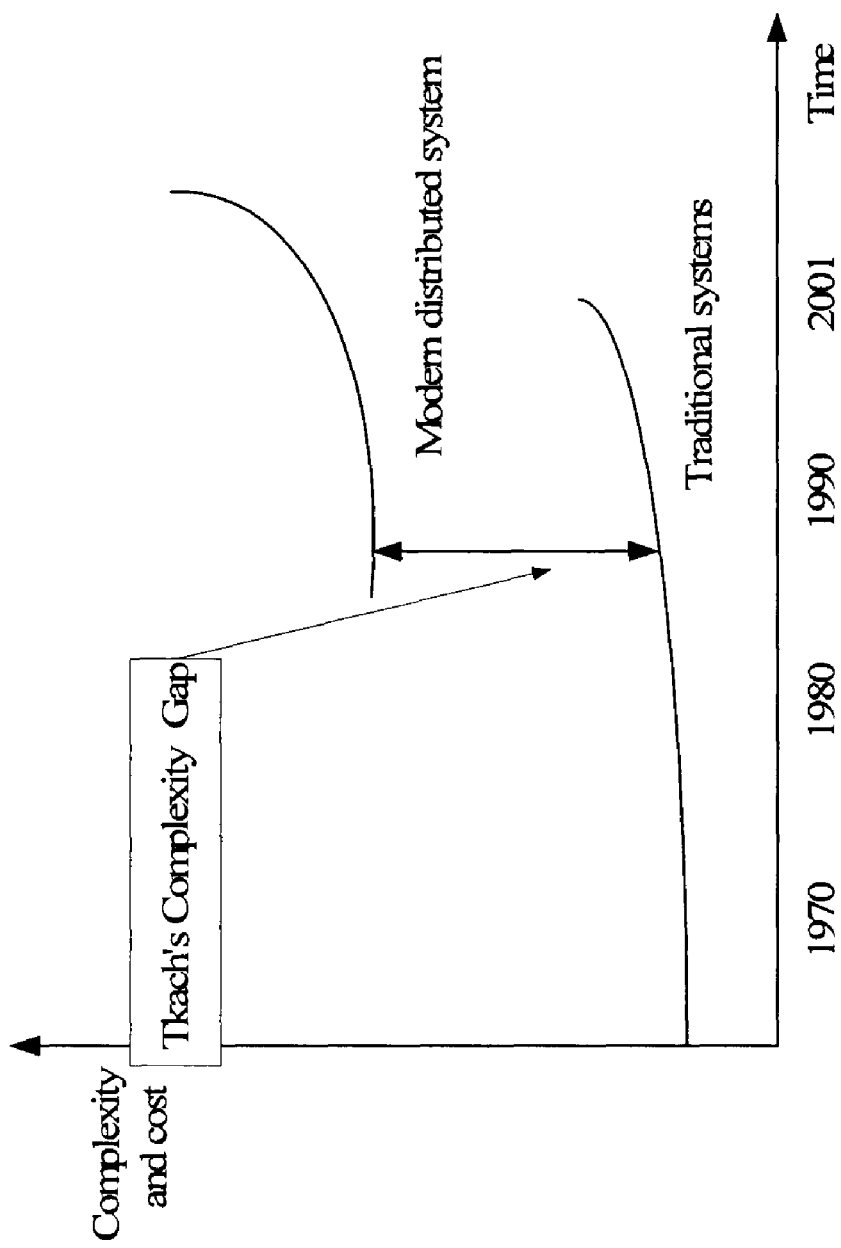
FIG. 1 shows the change of the complexity of electronic systems.
Figure 2:
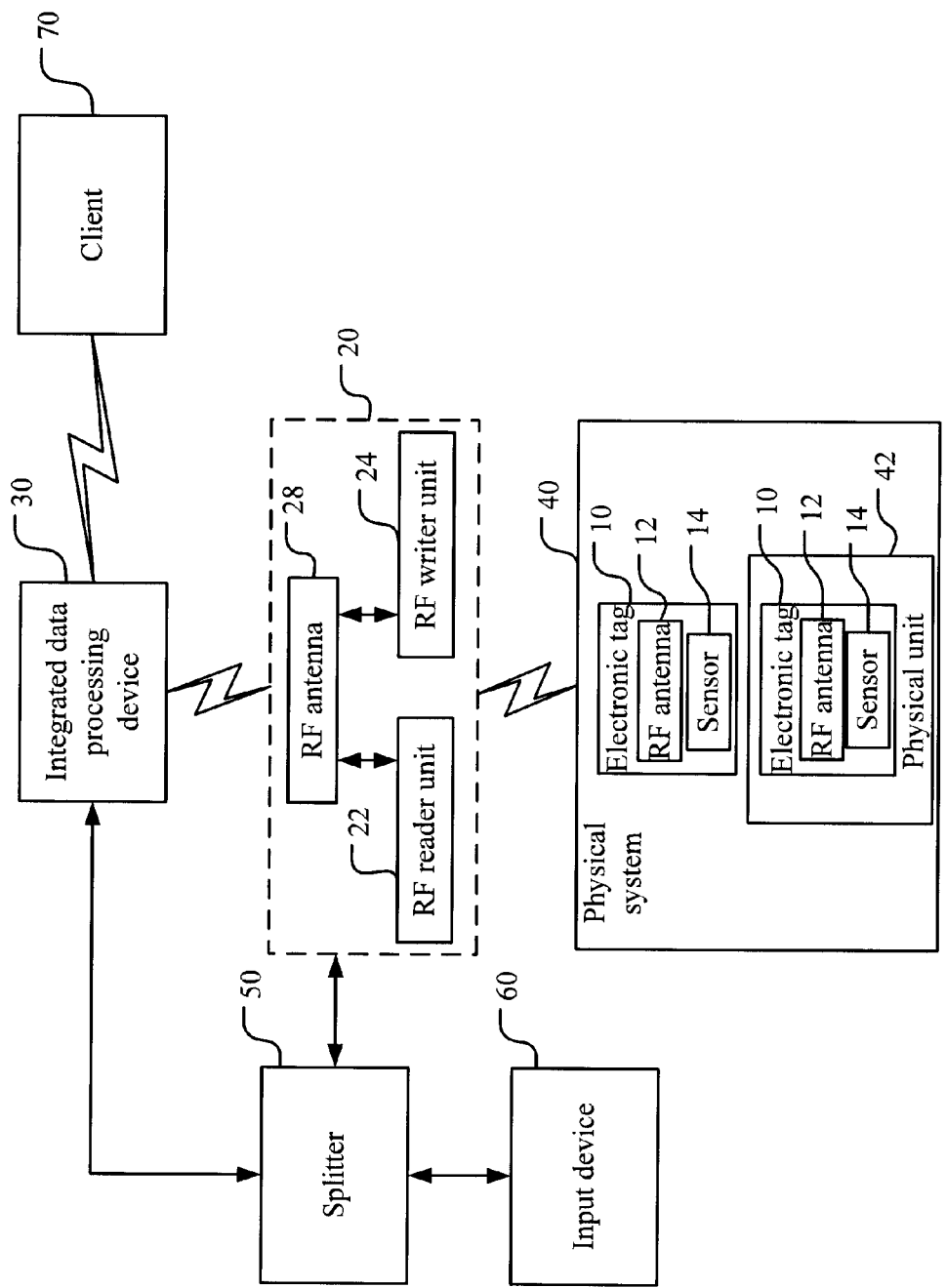
FIG. 2 shows a block diagram according to a preferred embodiment of the present invention.

FIG. 2 shows a block diagram according to a preferred embodiment of the present invention. As shown in the figure, the physical audit system according to the present invention comprises a plurality of electronic tags 10, a read/write device 20, and a backend integrated data processing device 30. The plurality of electronic tags 10 is set in a physical system 40 and a physical unit 42 included in the physical system 40, respectively. In modern electronic systems with high-tech precision structures, many single boards with many electronic components are inserted. That is in the circuit boards of the physical system 40, many physical units 42 of single boards are inserted thereon. Thereby, the plurality of electronic tags 10 is set in the physical system 40 and the physical units 42, respectively. Besides, the plurality of electronic tags 10 is laid out (soldered) directly on the circuit boards of the physical systems 40 and the physical units 42 for preventing the interference problems owing to the noises produced by the electromagnetic properties. In addition, the electronic tags 10 and the read/write device 20 further include a radio-frequency (RF) antenna 12 for transmitting physical configuration data. The RF antenna 12 includes a single antenna or flexible dual antennas such that the RF antenna 12 can bend in accordance with the installation environments, and thus the installation convenience is enhanced.

The read/write device 20 reads the physical configuration data of the plurality of electronic tags 10, and the physical configuration data is transmitted to the integrated data processing device 30 for examining the physical configuration data. The integrated data processing device 30 includes comparison data for performing analysis and comparison with the physical configuration data, and thereby for judging if the physical configuration data is identical to the comparison data in the integrated data processing device 30. The comparison data is the current-state configuration database stored in the physical memory (not shown in the figure) of the integrated data processing device 30. Besides, the read/write device 20 is a portable device; the physical configuration data is an electronic product code including function information, article information, activity-based information in a life cycle, engineering change, deviation, or waiver. When an audit personnel carries the read/write device 20 to perform audit, the physical configuration data is read according to the electronic product code of the electronic tag 10, and is transmitted to the integrated data processing device 30 for examining if the physical configuration data is identical to the comparison data. The function information in the electronic tag 10 is used for displaying the main function of the physical system 40 or the physical unit 42 such as the activities of coding, decoding, or filtering. The article information is used for displaying the product series number or manufacturing date of the physical system 40 or the physical unit 42. The activity-based information in a life cycle is the modified or updated record in the physical system 40 or the physical unit 42. The deviation records the event when the version or brand of a key component originally planned to be installed is missing, then a suitable substitute for the physical system 40 or the physical unit 42 is searched according to the specifications. The waiver records the situation when the current the physical system 40 or physical unit 42 is a substitute for a key component, and thereafter, it is necessary to replace the substitute back to the device of the physical system 40 or the physical unit 42 complying with specifications. For example, the physical system 40 or the physical unit 42 can use commercial-spec devices first. Afterwards, depending on the demand, the physical system 40 or the physical unit 42 can be changed back to standard military-spec devices.

In addition, the read/write device 20 of the audit system according to the present invention further includes an RF reader unit 22 and an RF writer unit 24. The RF reader unit 22 identifies the plurality of electronic tags 10, and reads and transmits the physical configuration data to the integrated data processing device 30. The RF writer unit 24 receives the physical configuration data of the plurality of electronic tags 10, and modifies or updates dynamically the physical configuration data. That is to say, when the physical unit 42 is damaged and has to be replaced, the data in the electronic tag 10 can be recorded by means of the RF writer unit 42. Alternatively, when the software or hardware data in the physical system 40 or the physical unit 42 need to be updated, the RF write unit 42 can be used to perform data updating. Besides, the read/write device 20 is a portable device, which is convenient in carrying for the audit personnel.

Moreover, the electronic tag 10 according to the present invention further includes a sensor 14 adapted in the electronic tag 10 for sensing the temperature change of the physical system 40 or the physical unit 42 and recording the operation temperature data thereof. Thereby, a system engineer can learn the current status of the physical system 40 or the physical unit 42 by observing the temperature change thereof, which can be used as a reference for system analysis and improvement.

The audit system according to the present invention further includes a splitter 50 and an input device 60. The splitter 50 is coupled to the read/write device 20 and the integrated data processing device 30; the input device 60 is coupled to the splitter 50. The read/write device 20 can choose system connection or offline operation. Offline operation includes using TCP/IP or Bluetooth to transmit data offline to the backend integrated data processing device 30. Alternatively, the splitter 50 can be used to a build system connection interface, for example, the RS-232 serial interface, for transmitting data to the backend integrated data processing device 30. Hence, the data software is not transmitted, and the software and hardware loading is not increased. The input device 60 can be used to input data to the read/write device 20 or to the integrated data processing device 30 by way of the splitter 50. The integrated data processing device 30 can transmit the processed physical configuration data to the client 70 through the Internet for informing the customer or contractor of the audited data.

Figure 3:
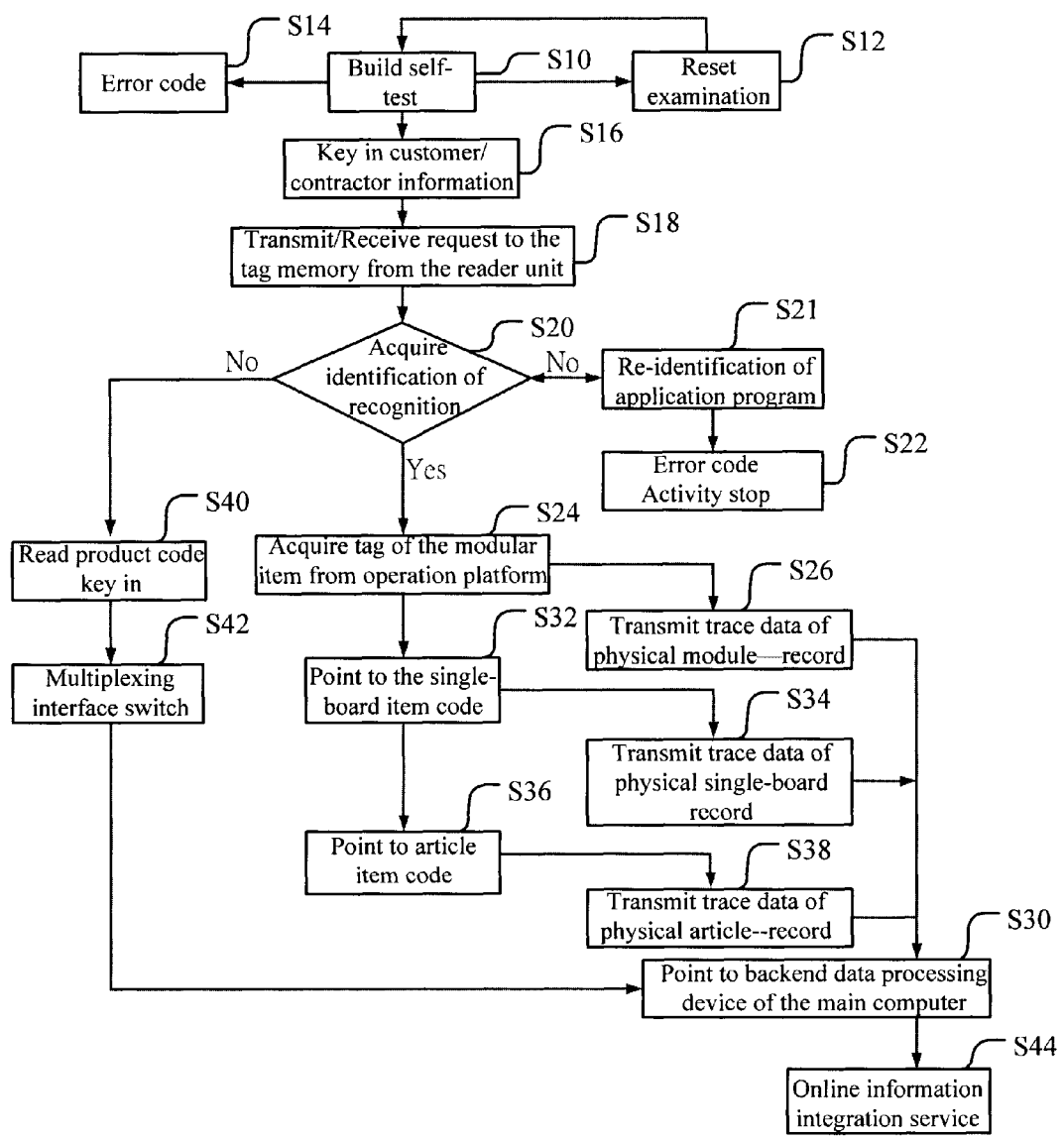
FIG. 3 shows a flowchart according to a preferred embodiment of the present invention.

FIG. 3 shows a flowchart according to a preferred embodiment of the present invention. As shown in the figure, when the audit personnel is to perform the physical configuration audit operation, the step S10 is first executed, in which the read/write device 20 will conduct the built-in self-test. When the operation cannot proceed normally, the read/write device 20 will be reset first (as shown in the step S12). If the normal operation still cannot proceed after several times of reset, an error code will be displayed (as shown in the step S14), and the step S16 is executed to input contract information, which is to input relevant contract data and operational parameters to be audited at present. Afterwards, the read/write device 20 will submit a read request to the electronic tag 10 (as shown in the step S18). Next, the step S20 is executed to acquire identification of recognition for the electronic tag 10. If the identification is not acquired, the reader application program of the read/write device 20 is reset for re-identification (as shown in the step S21). If the identification is not acquired after several times of reset, a related error code will be displayed (as shown in the step S22). When the identification is acquired, the read/write device 20 performs physical audit operations. First, the step S24 is executed to recognize and read the electronic product code in the electronic tag 10 of the physical system 40 and thereby the physical configuration data of the electronic tag 10. Then, the physical configuration data of the physical system 40 is transmitted (as shown in the step S26) to the integrated data processing device 30. If the audit operation needs to further acquire the physical configuration data of the single board of the physical unit 42 in the physical system 40, while executing the step S24, the audit personnel can further point to the electronic product code in the electronic tag 10 of the single board (as shown in the step S32). Afterwards, the step S34 is executed to transmit the physical configuration data of the physical system 40 to the integrated data processing device 30 (as shown in the step S30). Likewise, the audit personnel can also point to the electronic product code of the article of the single board (as shown in the step S36), and read and transmit the physical configuration data of the article (as shown in the step S38) to the integrated data processing device 30 (as shown in the step S30). Furthermore, the input device 60 can be used to input the codes of the electronic tag 10 directly and perform reading (as shown in the step S40) and, by means of the multiplexing interface (as shown in the step S42), transmitting to the back-end integrated data processing device 30 (as shown in the step S30). The integrated data processing device 30 can receive and transmit the physical configuration data of the read/write device 20, and then perform data collection, data type judgment, and announcement. Afterwards, the processed physical configuration data is transmitted to customers or contractors through the Internet (as shown in the step S44).

Besides, before performing the audit operations and before the steps S24 and S40, in order to increase the receiving sensitivity of the read/write device 20, sometimes the housing of the electronic physical system 40 is opened. Thereby, static charges tend to be produced and damage will be done. Hence, before the steps S24 and S40, static charge protection will be performed first.

Figure 4:
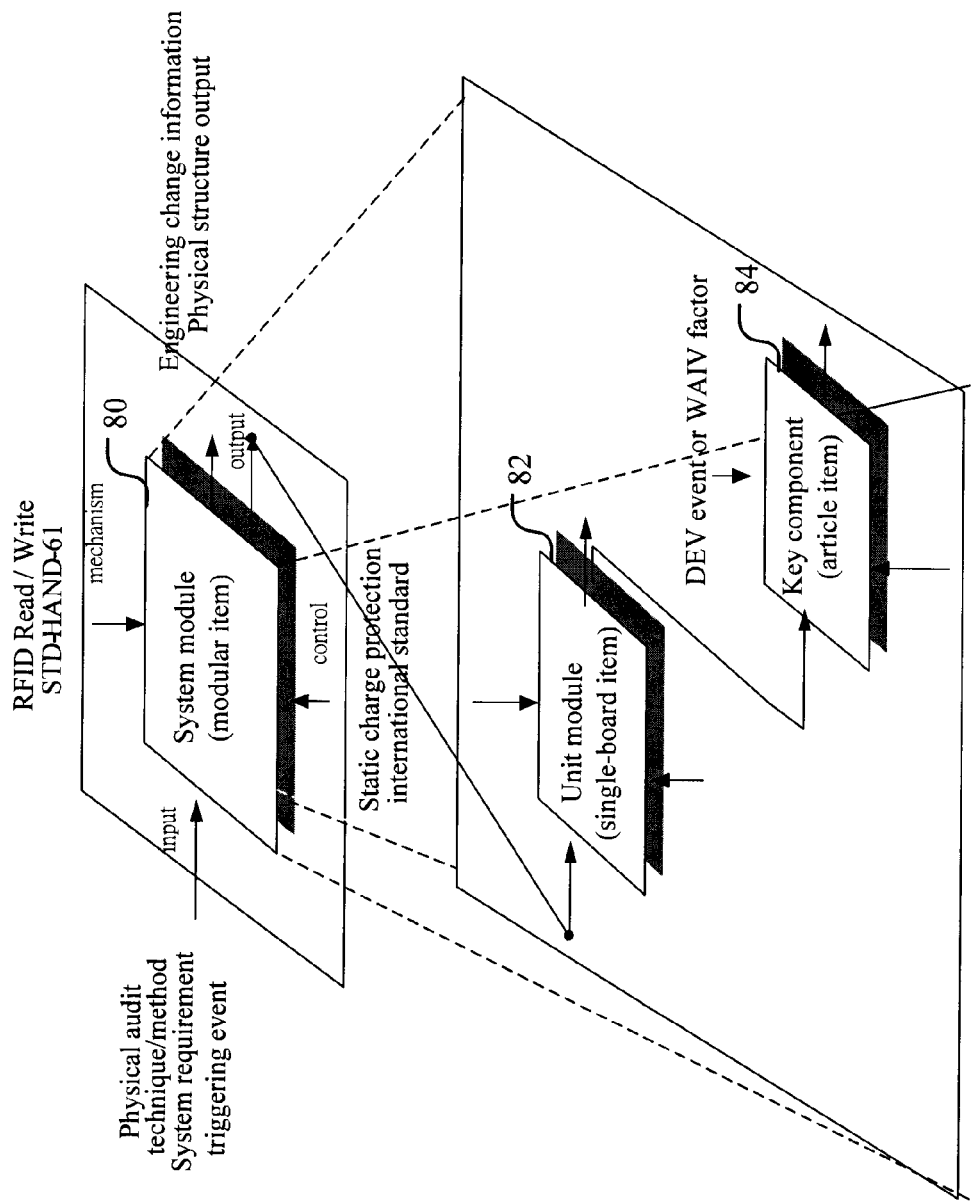
FIG. 4 shows a hierarchical relationship of the identification scope according to the IDEF method of the present invention.

FIG. 4 shows a hierarchical relationship of the identification scope according to the IDEF method of the present invention. As shown in the figure, the physical audit according to the present invention is digitized to be a framework for verifying and evaluating a system product. From the level of examining modular items 80, the scope of identifying modules is extended to the single-board modules 82, and then extended to the article information 84 level. In addition to the function information and the information inside an article, the history and locations can be presented in an identifiable and traceable modular configuration or audit application activities. Not only the deviation (Dev) and waiver (Waiv) of the article information can be controlled, but also the current physical configuration audit can be reinforced. In addition, when an article has problems, the problems can be identified rapidly, and the cause and influence can be evaluated as well. That is, in the audit operations, when the physical configuration data of the physical system 40 and the physical unit 42 is inconsistent with the stored data, by tracing the historical records, the problem can be found, and the cause can be inferred.

FIG. 5 shows a data table in an electronic tag according to a preferred embodiment of the present invention. As shown in the figure, the physical configuration data in the electronic tag 10 includes the memory capacity, the communication distance, the modular type data, the electronic tag number, and the environmental characteristics. The equipment module data is the basic data, such as the type, the vendor number, the number of the standard, and the contract number, of the physical system 40 and the physical unit 42 of the electronic tag. The stored data described above is only a preferred embodiment. The data is not limited to the data described above.

To sum up, the physical audit system with radio frequency identification (RFID) and the method thereof according to the present invention perform audit by means a plurality of electronic tags set in a physical system, a physical unit included in the physical system, respectively, and an RFID. Thereby, audit operations can be performed on systems of high-tech precision structures, and the difficulty of executing walk-through process can be reduced. In addition, article damage caused by disassembling the mechanical and electrical equipments can be avoided.

Accordingly, the present invention conforms to the legal requirements owing to its novelty, non-obviousness, and utility. However, the foregoing description is only a preferred embodiment of the present invention, not used to limit the scope and range of the present invention. Those equivalent changes or modifications made according to the shape, structure, feature, or spirit described in the claims of the present invention are included in the appended claims of the present invention.

The invention claimed is:

1. A physical audit system with radio frequency identification (RFID), comprising:

a plurality of electronic tags, set in a physical system and a plurality of physical units included in the physical system, respectively, and the plurality of electronic tags recording physical configuration data related to the physical system and to the physical units, respectively, wherein the physical configuration data includes function information, article information including product serial number or manufacturing date, activity-based information in a life cycle, engineering change, deviation signifying use of a substitute, and waiver signifying change back to specification;

a radio-frequency writer unit, writing the physical configuration data of a newer version according to the physical system and the physical units;

a radio-frequency reader unit, identifying the plurality of electronic tags, and reading and transmitting the physical configuration data; and an integrated data processing device, receiving the physical configuration data transmitted by the radio-frequency reader unit for auditing the physical configuration data in normal condition, and transmitting the physical configuration data of the newer version to the radio-frequency writer unit, wherein each electronic tag further includes a sensor adapted in the electronic tag for sensing a temperature change of the physical system or the associated physical unit, and recording an operation temperature data thereof, the integrated data processing device auditing the physical system or the physical units in accordance with the physical configuration data, wherein a transmission mode between the radio-frequency reader unit and the integrated data processing device, and the transmission mode between the radio-frequency writer unit and the integrated data processing device include a system connection mode and an offline mode, the transmission interface of the offline mode is a TCP/IP transmission interface or a Bluetooth transmission interface, and the transmission interface of the system connection mode is RS-232 transmission interface.

2. The system of claim 1, wherein the integrated data processing device stores comparison data, and judges if the physical configuration data is identical to the comparison data.

3. The system of claim 1, wherein the electronic tag is laid out on circuit boards of the physical system and the physical units.

4. The system of claim 1, wherein a memory of the electronic tag is laid out on circuit boards of the physical system and the physical units, and the capacity of the memory is increased according to the demand of data amount.

5. The system of claim 1, wherein the electronic tag further includes a radio-frequency antenna adapted in the electronic tag for transmitting the physical configuration data to the radio-frequency reader unit or the radio-frequency writer unit.

6. The system of claim 1, wherein the radio-frequency writer unit and the radio-frequency reader unit further include a radio-frequency antenna for writing or reading the physical configuration data to the electronic tag.

7. The system of claim 5 or claim 6, wherein the radio-frequency antenna is a multiplexing cable.

8. The system of claim 7, wherein the multiplexing cable is a single antenna or flexible dual antennas.

9. The system of claim 1, wherein the electronic tag is an active electronic tag.

10. A physical audit method with radio frequency identification (RFID), performing physical audit by means of RFID, and comprising steps of:
   providing a plurality of electronic tags, wherein each electronic tag having a sensor adapted in the electronic tag operable to sense and record at least a temperature change of a physical system or a plurality of physical units;
   setting the plurality of the electronic tags in the physical system and the plurality of physical units included in the physical system, the plurality of electronic tags recording physical configuration data related to the physical system and to the physical units, respectively, wherein the physical configuration data includes function information, article information including product serial number or manufacturing date, activity-based information in a life cycle, engineering change, deviation signifying use of a substitute, and waiver signifying change back to specification;
   sensing the temperature change of the physical system or the physical units, and recording an operation temperature data thereof;
   writing the physical configuration data of a newer version according to the physical system and the physical units to the plurality of electronic tags by a radio-frequency writer unit;
   identifying the plurality of electronic tags, and reading and transmitting the physical configuration data according to the physical system and the physical units from the plurality of electronic tags by a radio-frequency reader unit; and
   providing an integrated data processing device to receive the physical configuration data transmitted by the radio frequency reader unit for auditing the physical configuration data in normal condition, and to transmit the physical configuration data of the newer version to the radio frequency writer unit, wherein a transmission mode between the radio-frequency reader unit and the integrated data processing device, and the transmission mode between the radio-frequency writer unit and the integrated data processing device include a system connection mode and an offline mode, the transmission interface of the offline mode is a TCP/IP transmission interface or a Bluetooth transmission interface, and the transmission interface of the system connection mode is RS-232 transmission interface; and
   auditing, by the integrated data processing device, the physical system or the physical units in accordance with the physical configuration data while the physical system and the physical units are in normal condition.

11. The method of claim 10, wherein in the step of auditing the physical configuration data, according to comparison data, it is judged if the physical configuration is identical to comparison data.

12. The method of claim 10, and further comprising a step of transmitting the audited physical configuration data to a client.

* * * * *